(12) United States Patent
Gandhi et al.

(10) Patent No.: US 7,228,134 B2
(45) Date of Patent: Jun. 5, 2007

(54) METHOD OF MINIMIZING REVERSE CHANNEL INTERFERENCE CAUSED BY AN ABNORMALLY HIGH NUMBER OF ACCESS ATTEMPTS IN A WIRELESS COMMUNICATIONS SYSTEM

(75) Inventors: Asif D Gandhi, Iselin, NJ (US); Mathew Thomas, Madison, NJ (US); Lily H Zhu, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 764 days.

(21) Appl. No.: 10/463,995

(22) Filed: Jun. 17, 2003

(65) Prior Publication Data
US 2004/0259528 A1 Dec. 23, 2004

(51) Int. Cl.
*H04Q 7/20* (2006.01)
(52) U.S. Cl. .................. 455/434; 455/450; 455/515
(58) Field of Classification Search ............ 455/452.1, 455/452.2, 453
See application file for complete search history.

(56) References Cited

U.S. PATENT DOCUMENTS

| | | | |
|---|---|---|---|
| 5,544,196 A | 8/1996 | Tiedemann et al. ......... 375/200 |
| 6,535,736 B1 * | 3/2003 | Balogh et al. .............. 455/434 |
| 2002/0082032 A1 | 6/2002 | Hunzinger .................. 455/510 |
| 2002/0090916 A1 * | 7/2002 | Abramovici et al. .......... 455/70 |
| 2002/0173316 A1 * | 11/2002 | Jang et al. .................. 455/453 |
| 2003/0190937 A1 * | 10/2003 | Karmi et al. ............... 455/574 |

FOREIGN PATENT DOCUMENTS

WO  WO 95/35637  12/1995
WO  WO 97/09836  3/1997

OTHER PUBLICATIONS

European Search Report.

* cited by examiner

*Primary Examiner*—Creighton Smith
(74) *Attorney, Agent, or Firm*—Stephen M. Gurey

(57) ABSTRACT

When an overload condition is determined to exist at a base station in a wireless communications system based on the number of unsuccessful access attempts to access the system relative to the successful access attempts to access the system, the base station broadcasts a message to each mobile terminal within its coverage area that changes at least one access probe-related parameter associated with at least one of: the number, the frequency, and the power intensity of the access probes made by these mobile terminals as they attempt to establish access to the wireless network. By so limiting these access probes in some manner when an overload condition is present, the interference caused on the reverse link by many mobile terminals attempting access is reduced.

19 Claims, 3 Drawing Sheets

METHOD OF MINIMIZING REVERSE CHANNEL INTERFERENCE CAUSED BY AN ABNORMALLY HIGH NUMBER OF ACCESS ATTEMPTS IN A WIRELESS COMMUNICATIONS SYSTEM

TECHNICAL FIELD

The present invention relates to telecommunications, and more particularly, to a wireless communication system.

BACKGROUND OF THE INVENTION

Not every attempt by a mobile terminal to access a wireless communications network succeeds in establishing a connection to the network. An access attempt may not mature into a connection to the network due to an RF-related failure, as for example a weak RF signal, or a non-RF related failure, as for example a lack of base station amplifier power, the lack of an available base station, base station processing overload, the lack of transmission resources between the base station and the switch to which it is connected, or an overload condition at the switch. Thus, if the network reaches its maximum capacity to handle calls, subsequent access attempts will not result into a viable connection. Each access attempt, if the base station recognizes it, is recorded as a "seizure." Under normal conditions, however, operating at the load the base station and switch have been designed to handle, most seizures result in what is known as an "assignment" by the base station. Under normal circumstances, a very high percentage, for example 98–99%, of seizures become assignments. It should be noted that once a call is assigned by a base station, other factors such as various network conditions and the called party's status, may preclude completion of network connection to its intended destination.

There are times, however, when the number of access attempts within a base station's coverage area may be significantly higher than the capacity of that base station or the wireless network. Such an abnormally busy period could result from a local or wide-area emergency or a time-related condition. For example, any hot activity in a localized area caused by, for example, a local emergency such as a plane crash or a massive highway accident, the ending of a highly attended football or baseball game, or the switching from more costly "day minutes" to free "night minutes" at 8:00 PM or 9:00 PM, could result in a large number of unsuccessful access attempts at a base station. This abnormally high volume of access attempts could last for a period of only several minutes or could extend for over an hour or more depending on the cause of the high level of activity. In rare emergency situations, such as in the aftermath of the World Trade Center tragedy on Sep. 11, 2001, an overload condition existed over an extended period of time. As a result of any such overload condition, the large number of almost simultaneous access attempts that is beyond the capacity for which the wireless network has been designed can have a deleterious effect on those ongoing calls that have succeeded in obtaining an assignment. Specifically, the access probes generated and transmitted on the common reverse access channel by the many mobile terminals in their unsuccessful access attempts at generally increasing power levels will create interference on the reverse link that shares the same spectrum as the reverse access channel and that is used by all the mobile terminals that have been able to obtain an assignment. As a result, the large number of access probes made at what are increasing power levels can affect the frame error rate of the ongoing voice or data calls. Furthermore, the interference created on the reverse link can cause a choke situation in which the coverage area of the sector shrinks, thereby precluding calls from getting through and possibly prematurely terminating ongoing calls.

SUMMARY OF THE INVENTION

In accordance with an embodiment of the present invention, when an overload condition is determined to be present at a base station in a wireless communications system, one or more of the mobile terminals within the base station's coverage area are sent a message that contains information for controlling the access attempts made by those mobile terminals.

In an embodiment of the invention, an overload condition is determined to exist based on the number of unsuccessful access attempts to access the system relative to the successful access attempts to access the system. Specifically, in an embodiment, this is based on the number of seizures relative to the number of assignments over a predefined period of time. When an overload condition is determined to exist, the base station broadcasts a message to each mobile terminal within its coverage area that changes at least one probe-related parameter associated with at least one of: the number, the frequency, and the intensity of the access probes transmitted by these mobile terminals as they attempt to establish access to the wireless network. By limiting, or in certain embodiments, completely stopping the transmission of these access probes, the interference caused on the reverse link is reduced.

In accordance with an embodiment of the invention, the transmitted message is part of an overhead message that is continuously transmitted downlink on the paging channel to all mobile terminals and which contains various system parameter values including access probe-related parameter values. When an overload condition is determined to exist, the value of one or more of such probe-related parameters are changed so as to reduce the number and/or the frequency of, and/or to vary the power intensity of the probes transmitted by each mobile terminal in accessing the wireless network. More specifically, these probe-related parameters are, for example, from the group of: the number of probes in a sequence of probes transmitted by the mobile terminal in its attempt to make a connection with the network; the number probes sequences that a mobile terminal makes in its attempt to make a connection; the inter-probe timing between probes in each sequence of probes and/or the inter-sequence timing between sequences of probes; and the power at which a probe is transmitted.

As the overload condition begins to ease, indicated in the embodiment of the invention by a decrease in the relative difference between the number of seizures and assignments, the value of each probe-related parameter transmitted in the overhead message is gradually returned to the default value that it had prior to the overload condition.

In another embodiment, alternatively, or in conjunction with the previous embodiment, when an overload condition is determined to exist, a message is sent to inhibit a specific mobile terminal from making any access requests at all for a specified period of time. This message is sent on the paging channel to a mobile terminal after it has successfully completed a connection to prevent it from attempting to make another access attempt for a specified period of time, thereby providing "fairness" to the other mobile terminals that are attempting to access the network during an overload condition. Alternatively, when an overload condition exists, such a message could be sent on the paging channel to a mobile terminal after an access probe transmitted by that mobile terminal has been recognized by the base station to prevent that mobile terminal from reattempting to send another access probe for a specified time period.

Alternatively or in conjunction with the above embodiments of the present invention, in the presence of an overload condition, the base station can send a redirection message to a subset of all the mobile terminals within the base station's coverage area that redirects access attempts by any mobile terminal in that subset to another system (a redirection target system) that doesn't exist or doesn't share the same channel list message with the accessed/overloaded system. By continuously broadcasting the redirection message on the paging channel, the mobile terminals in the subset will be unable to access the overloaded system. After the overload condition has eased, the overloaded system can stop transmitting the redirection message on the paging channel. A fairness/randomness can be added to this method by alternately transmitting a redirection message to different subsets of the mobile terminals to the non-existent system in different periods of time.

BRIEF DESCRIPTION OF THE DRAWING

The present invention will be better understood from reading the following description of non-limiting embodiments, with reference to the attached drawings, wherein below.

DETAILED DESCRIPTION

Figure 1:
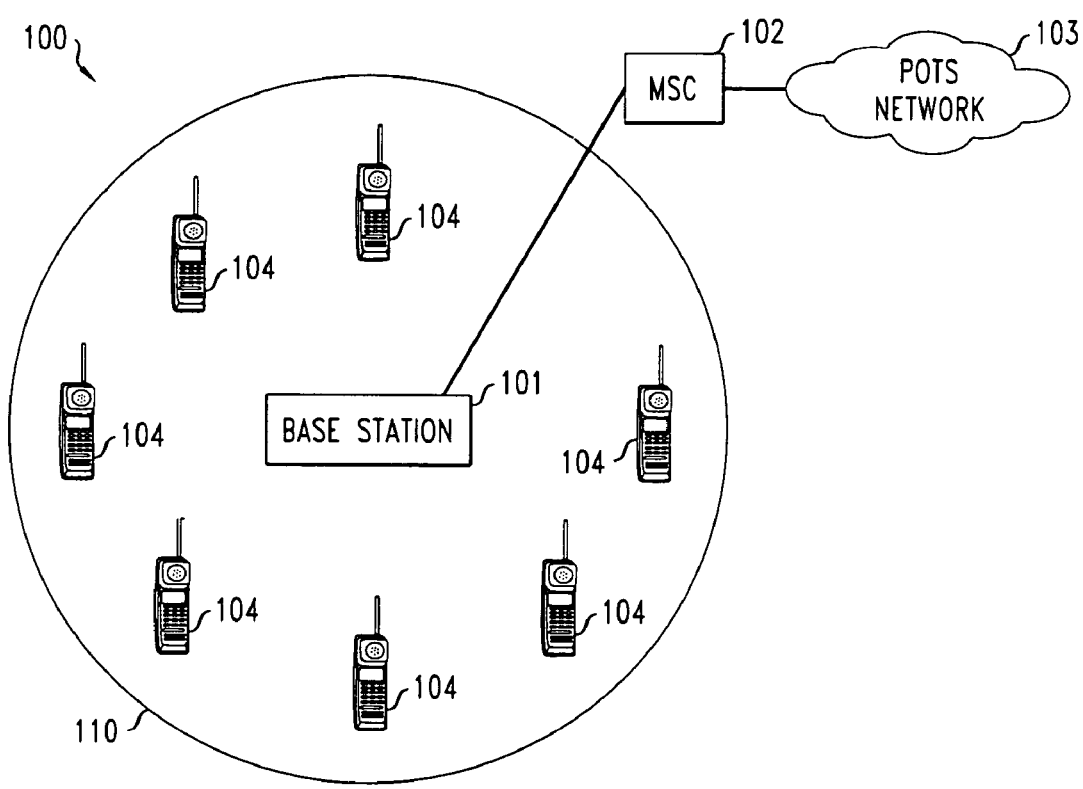
FIG. 1 shows a wireless communications system in which a plurality of mobile terminals are communicating with or attempting to establish communication with a base station.

With reference to FIG. 1, a wireless communications system 100 is shown in which a base station 101 is connected to a Mobile Switching Center (MSC) 102. In certain embodiments, a Base Station Controller (BSC) may be connected between the base station 101 and MSC 102. Other base stations (not shown) will also be connected to MSC 102. MSC 102, in turn, is connected to the wireline POTS telephone network 103. A plurality of mobile terminals 104 can access the wireless network 100 and, in turn, the wireline POTS telephone network 103, through base station 101 as long as they are within the coverage area 110 of that base station. Each time one of the mobile terminals 104 attempts to access the network, it makes an access request on a common reverse access channel an in the form of an access probe. If the wireless network recognizes the access probe, the base station 101 sends a response downlink to the mobile terminal 104 and the mobile terminal stops transmitting any more access probes. The base station 101 then records the fact that it has recognized the access request as a seizure. Even though the network has recognized the access attempt and has responded to the mobile terminal's request, various previously described network conditions may prevent it from establishing a connection. If, for example, there is a bottleneck anywhere in the system due to a lack of capacity, the call will time-out and not be completed. If a connection is established, the base station records this event as an assignment. Generally, as afore-noted, under normal operating conditions, the number of assignments will be very close to the number of seizures. For various reasons, frequently related to a large number of mobile terminals attempting to simultaneously access the wireless network, an access probe will not be recognized by the base station. If the mobile terminal doesn't receive an expected response from the base station to the probe, it generally will continue to transmit a certain number of probes at increasing power levels until it does receive a response from the base station or that maximum is reached. Failing to receive a response from the base station, the mobile terminal will then, after a period of time, start again to transmit a sequence of probes at increasing power levels within the sequence, until either a response is received from the base station. This process continues until a response is received or a maximum number of sequences have been transmitted.

Figure 2:
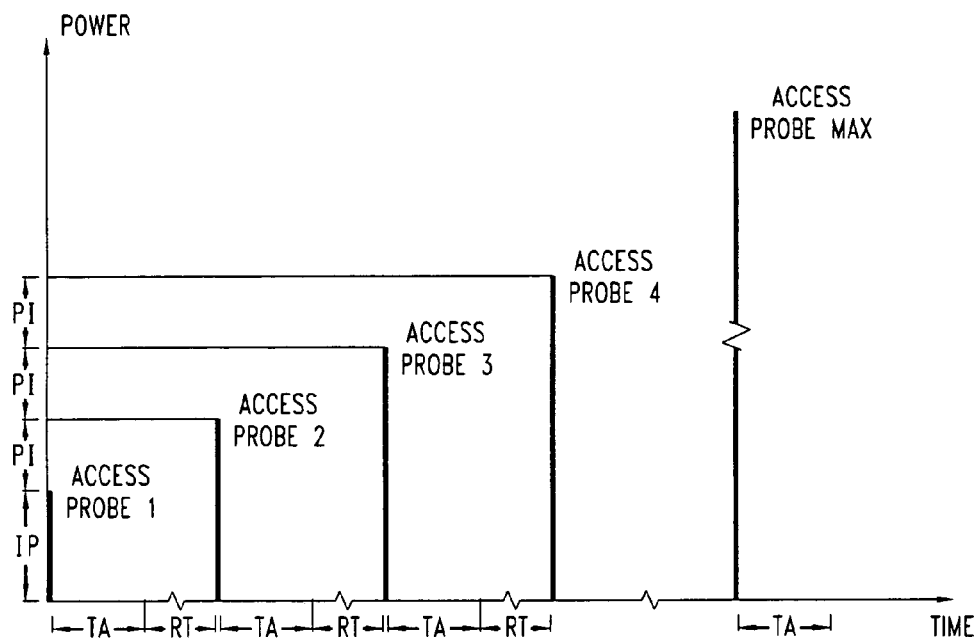
FIG. 2 is a timing diagram showing an example of multiple sequences of access probes transmitted by a mobile terminal as it attempts to access the wireless network.

FIG. 2 shows an example of the timing of access probes within a sequence of probes in accordance with an exemplary wireless system operating in accordance with the TIA/EIA/IS-95-A standard. The CMDA2000 and IS-856 (for 1×-EV-DO) standards are similar. As can be noted, an initial access probe (probe 1) is transmitted at an initial power IP. The time TA, the access timeout interval, represents the expected waiting time for a response from the base station, and RT, a back-off delay between probes, is an additional margin time allowed for receiving a response from the base station. If the mobile terminal does not receive a response within the time period TA+RT, it then transmits a second probe, access probe 2, at a stepped up power level IP+PI. Again, if no response is received within the time period TA+RT that follows access probe 2, a third access probe, access probe 3, is transmitted at an again stepped-up power level IP+2PI. This continues at increasing power levels until a specified maximum number of access probes have been transmitted. The access probe power is capped, however, at the maximum allowed mobile terminal transmit power. The afore-noted standard allows a maximum of 16 access probes in an access probe sequence. Typically, however, a service provider limits the maximum number of access probes to a fewer value, such as five.

Figure 3:
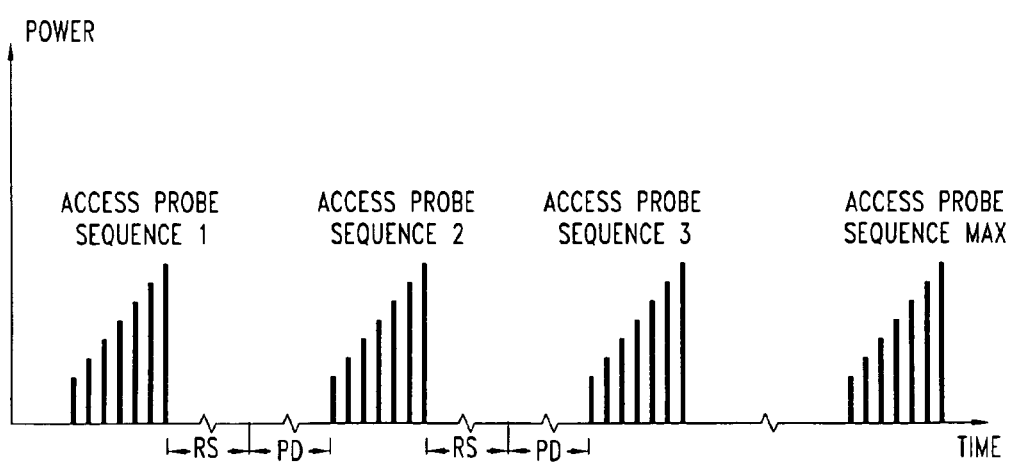
FIG. 3 is a timing diagram that shows an example of the relationship between individual access probes within each sequence of access probes.

FIG. 3 shows the timing relationship between the sequences of access probes. After a first access probe sequence, a delay between probe sequences of RS+PD is imposed before the mobile terminal transmits a second sequence of access probes, where RS is an imposed delay between probe sequences, and PD is a persistence delay that a mobile terminal automatically generates to reduce the likelihood that two mobiles might be simultaneously transmitting sequences of access probes. The mobile terminal will transmit a specified maximum number of access probe sequences before all attempts are aborted. According to the afore-noted standard, the maximum number of access probe sequences that a mobile terminal can transmit is 15. Typically, however, a service provider will limit the maximum number of access probe sequences to a smaller value, such as eight, before the mobile terminal aborts its attempts. Certain mobiles terminals, however, may have silent retries built into them, in which they again go through a cycle of multi-probe sequences before further access attempts are aborted.

Generally, the base station 101 continuously broadcasts an overhead message over the paging channel to the mobile terminals 104 within its coverage area 110 that provides, among other information, the values of the parameters to be used by each mobile terminal in transmitting access probes. These include, but are not limited to the described RS, TA, RT, IP and PI parameters, as well as the maximum number of access probes transmitted in each sequence and the maximum number of sequences of probes.

As previously described, an event or condition may occur within the coverage area 110 of base station 101 that stimulates a large number of mobile terminal users within that coverage area to suddenly initiate a wireless call. For example, if an accident occurs between two vehicles a rush hour on a highway within area 110 causing a major traffic jam, many mobile terminal users who are stuck in traffic will suddenly together attempt to place a wireless call to their home or office. Due to the lack of capacity at the base station 101 and/or at MSC 102 to handle such a sudden and large number of calls than they normally would be expected, the base station 101 will not even recognize many access requests. Upon likely not receiving a response to a first transmitted access probe, each mobile terminal 104 that is attempting to access the wireless network will transmit repeated sequences of access probes of increasing power, as shown in FIGS. 2 and 3 until either a probe is recognized by base station 101 and the base station transmits a response, or the base station fails to respond at all. If, in fact the base station 101 does respond and record a seizure, the base station 101 may still be unable to establish an assignment due to the overload condition present in the network, causing the call to time-out. The effect of a multitude of mobile terminals transmitting repeated access probes on the reverse access channel as they try to access the network is the creation of interference on the reverse link being used for transmission by the mobile terminals that have been successful in establishing a connection. As previously noted, this can affect the frame error rate of the ongoing calls through the base station and can cause a choke situation in which the coverage area of the sector shrinks, and possible prematurely terminating ongoing calls.

In this illustrative embodiment, when the base station 101 determines the existence of an overload condition, it controls the transmission of access probes so as to limit their number, frequency and/or intensity, thereby reducing the interference to the reverse link. In this embodiment, an overload condition is determined when the number of seizures relative to the number of assignments over a predefined period of time is greater than a predetermined threshold. Thus, when the number of seizures, o_z, is more than, for example, 50% greater than number of assignments, o_a, over a time period of, for example, five minutes, then corrective action is taken to control the transmission of access probes by the mobile terminals 104. This corrective action can take many forms.

In an exemplary embodiment, an overload condition is determined to exist when, for example:

$$o\_z > 1.5 \times o\_a \quad (1)$$

over a common 5-minute interval. This 5-minute time interval serves as an example that is chosen as to not be too long, so as to avoid having to wait too long a period before taking corrective action, and not too shorts, so as to avoid triggering corrective action for an even that self-corrects itself. The access probe parameters that are continuously broadcast on the paging channel in an overhead message are changed so as to reduce the number of access probes in a sequence to, for example, two, and to increase the time delay between probe sequences, RS, by a factor of, for example, two. After effecting the parameter change, a base station may wait a period of time, such as 60 seconds, and then measure o_a and o_z over the next 5-minute interval. If an overload condition still exists, using the same criteria as in equation (1), then RS can again be increased by a factor of two. The process can be repeated as long as the overload condition continues to exist over subsequent 5-minute intervals, with RS being increased at each iteration until a maximum value of RS is reached. Further, when an overload condition is determined to be present, additional or alternative access probe parameters can be changed, such as the access timeout interval TA, the back-off delay between probes, RT, the initial power of each probe IP, and the power increase of each probe, PI. For example, during an overload condition, the mobile terminals might only transmit only two access probes at a higher than normal power level.

As the overload condition begins to ease, which is recognized by a reduction in the percentage at which the number of seizures exceeds the number of assignments, then the values of the access probe parameters that have been changed can begin to be returned back to their default values that were used prior to the overload condition. For example, after an overload condition has effected the change of one or more access parameters, a determination might be made that:

$$o\_z < 1.2 \times o\_a \quad (2)$$

over a subsequent 5-minute period. One or more of the access probe parameters can then begin to be changed back to its default value. For the example above, if o_z<1.2×o_a over a 5-minute period, then if RS is greater than its default value, it will be decreased in half (or to its default value). After a 60 second period, o_z and o_a are again determined over the next 5-minute period and if o_z is still less than 1.2×o_a, then RS is further decreased in half again. If, however, RS has been reduced to its default value, then the number of access probes is set to its default value. In a similar manner, each of the other parameter values that were changed when the overload condition was detected is also gradually returned to its respective default value as the overload condition abates.

Figure 4:
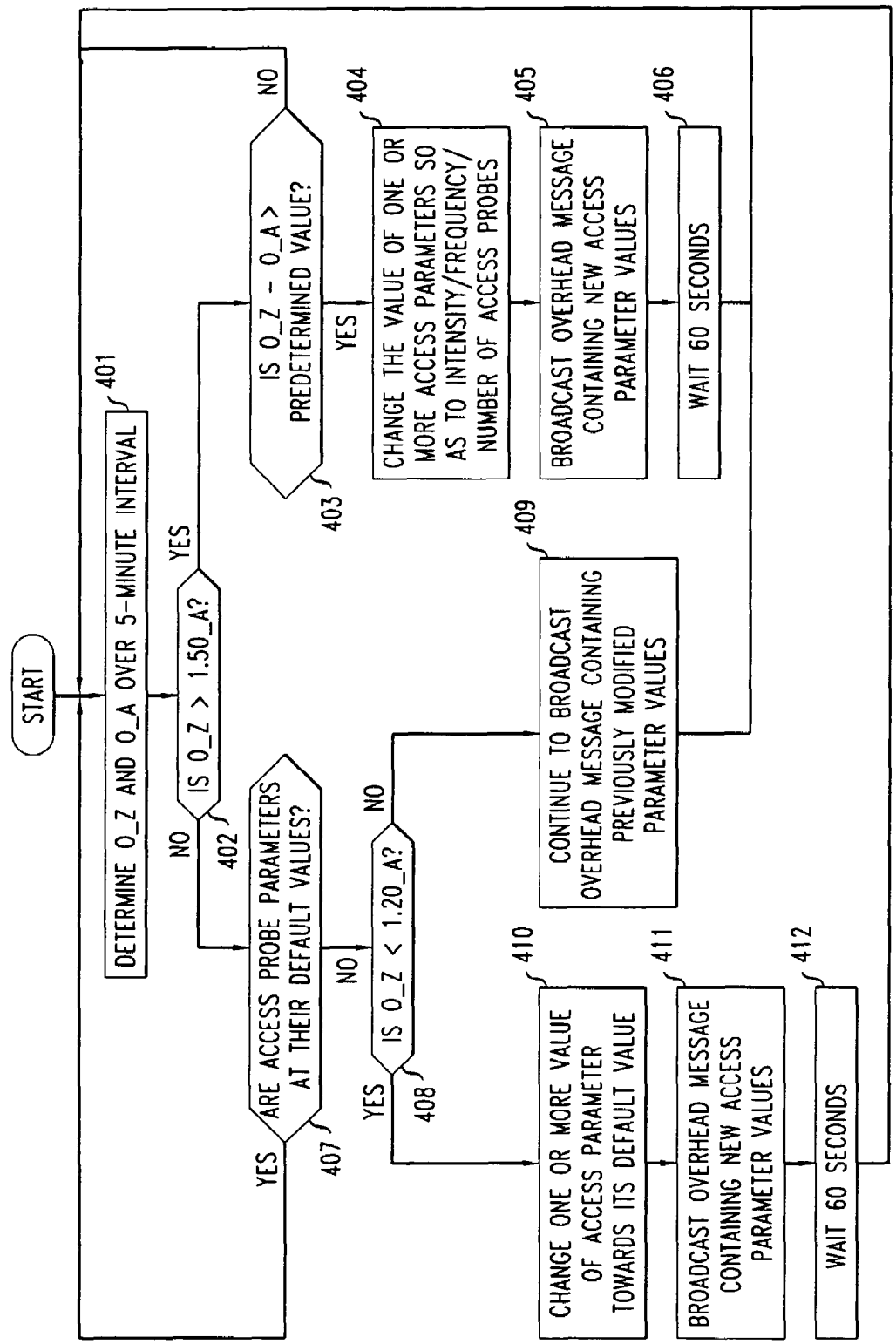
FIG. 4 is a flowchart showing an embodiment of a method performed at a base station in accordance with the present invention.

Boundary condition may also be taken into account to prevent the triggering of an overload condition when o_z is greater than 1.5×o_a, but when the absolute difference between o_z and o_a is actually small. Thus, for example, if in a 5-minute period o_a=5 and o_a=2, where in that 5-minute period three specific access attempts may have failed due to bad RF, etc., then reaction to an overload condition is not warranted. To avoid triggering of corrective action for an overload condition when one doesn't really exist, therefore, a determination is made, for example, whether the difference between o_z and o_a is sufficiently large to warrant corrective action when the criteria of equation (1) is indicative of the existence of an overload condition. If the difference is not sufficiently large, then the access parameters are not changed The flowchart in FIG. 4 summarizes the steps of the above-described embodiment. At step 401, the number of seizures, o_z, and the number of assignments, o_a, are determined over a 5-minute period. At step 402, a determination is made whether o_z is greater than 1.5×o_a. If it is, then at step 403, a determination is made whether the difference between o_z and o_a is greater than a predetermined value to avoid the above-noted boundary condition. If it is not, then an overload condition does not exist for which corrective action need be taken and the default values of the access probe parameters continue to be broadcast on the paging channel in the overhead message. If the determination at step 403 is positive, then an overload condition exists for which corrective control of access attempts will be made and, at step 404, the value of one or more access probe parameters is changed. At step 405, the next broadcast on the paging channel of the overhead message contains these changed access probe parameters as well as the default values of those parameters that were not changed. At step 406, processing waits for one minute, before returning to step 401 to determine whether, in the next 5-minute interval, an overload condition is still present. If the number of seizures is still greater than 1.5 times the number of assignments, then one or more access probe parameter values may again be changed.

If, at step 402, a determination is made that the number of seizures is not greater than 1.5 times the number of assignments, then, at step 407, a determination is made whether the access probe parameter values are at their default values. If they are, then processing returns to step 401 to measure o_z and o_a in the next 5-minute interval. If one or more access probe parameter is not at its default value, then, at step 408, a determination is made whether within the last 5-minute interval the number of seizures is less than 1.2 times the number of assignments. If it is not, then a previously determined overload condition continues to exist, but not at as severe a degree as when initially determined. The base station, however, step 409, continues to broadcast an overhead message containing the access probe parameters as they were previously modified. If, at step 408, the number of seizures is determined to be less than the 1.2 times the number of assignments, then, at step 410, one or more of the access probe parameters that had previously been changed is gradually moved toward its default value. At step 411, the newly modified access probe parameters are incorporated into the overhead message at its next broadcast. After waiting for one minute, at step 412, processing returns to step 401 to measure the number of seizures and the number of assignments in the next 5-minute interval. Repeated traversals of steps 401, 402, 407, 408, 410, 411 and 412 are made until each access probe parameter has returned to its default value.

In addition to or as alternatives to the above-described control of the access probe parameters associated with the transmission by a mobile terminal of access probes, other methodologies can be used to control the access attempts upon determining the existence of an overload condition so as to reduce the interference on the reverse link caused when too many mobile terminals attempt to access the network within a short interval of time.

As an example, the current TIA/EIA/IS-2000 3G mobile standard for packet data calls supports the sending a specific mobile terminal that has completed a packet data call a message on the paging channel that specifies a retry delay of between 0–127 seconds during which that mobile terminal is precluded from sending new access attempts for a next packet data call. Thus, when an overload condition is determined to exist, the base station sends such a message to a mobile terminal that has completed a call, thereby allowing other mobile terminal "fair" access to the system during the busy period. Although the current standard is directed to packet data calls, the current standards could be modified to accommodate the sending of such a message on both voice and data calls. Further, the standards could be modified to accept the sending of such a message to a specific mobile terminal when an overload condition is present in response to the receipt and recognition by the base station of an access attempt from that mobile terminal to which the base station cannot respond. Thus, during such an overload condition, that mobile terminal will be totally precluded from making further access attempts for a specified period of time. As more and more mobile terminals receive such a message, the net effect is a reduction in the number of access attempts received by the base station, and a gradual transition out of the overload condition. Although not supported by current standards, a modification to the applicable standards would enable support of such a message.

Access attempts can be further controlled when an overload condition is detected by broadcasting a Global Service Redirection (GSR) message on the paging channel that is directed to a subset of the mobile terminals in the base station's coverage area and which subset is defined by mobile terminals having a specified access overload class, which is normally the last digit of the mobile directory number. A GSR message redirects these identified mobile terminals to a redirection target system, which in this case, since there may be no other non-busy carrier or system to redirect them to, can be a non-existent system or a system that doesn't share the same channel list message with the overloaded accessed system. These mobile terminals will not be able to find service after searching for the redirection target system specified in the GSR message. Thus, the mobile terminals will come back to the original overloaded accessed system, but will be unable to access the original accessed system until they have received all the overhead messages on the paging channel. By the continuous broadcast of the redirection message on the paging channel, these mobiles will be redirected again to the unavailable redirection target system and will not cause additional interference and RSSI rise. For example, in the presence of an overload condition, a GSR can be broadcast that redirects all mobiles having mobile directory numbers that end in "1", "3", or "5" to the unavailable redirection target. Thus, approximately 30% of the mobile terminals attempting to access the overloaded wireless system will be redirected to an unavailable redirection target system, thereby precluding access attempts from any of these mobiles from reaching the overloaded base station, and reducing the number of access attempts upon the base station. Until a new GSR is broadcast, these mobile terminals will be blocked from service. After a period of time, for example, after two minutes, a new GSR can be broadcast enabling the original subset of mobile terminals to be redirected back to the original system and redirecting a different subset of mobile terminals having mobile directory numbers that end in a different set of digits to the unavailable redirection target system. Overall, therefore, precluding service to changing groups of mobile terminals reduces the number of access attempts upon the overloaded system and provides a fairness/randomness to this method.

Although generally described above in connection with IS-95A standards for 2G wireless voice calls, the present invention can be applied to both voice and data calls in 2G system and or in 3G system. It can also be employed in a 1xEV-DO system, in a UMTS system, and any kind of CDMA wireless system. It can also find applicability in any other type of wireless system, such as a TDMA system or an analog AMPS system.

Further, while the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method in a wireless communications system in which one or more mobile terminals attempt to establish communications with a base station through at least one access attempt, the method comprising the steps of:
    when an overload condition is determined to be present, sending in a message information for controlling the access attempt,
    wherein the access attempt comprises one or more access probes transmitted by the mobile terminal and the information in the message is for controlling the transmission of at least one of: the number of access probes, the frequency of the access probes, and the intensity of the access probes, and
    wherein an overload condition is determined to be present when a number of seizures relative to a number of assignments recorded by the base station over a predefined period of time is greater than a predetermined threshold.

2. The method of claim 1 wherein the message is an overhead message that is continuously transmitted on a paging channel.

3. The method of claim 1 wherein an overload condition is determined to be present only when the difference between the number of seizures and the number of assignments is greater than a predetermined number.

4. The method of claim 1 wherein the information in the message is used to change the value of at least one probe-related parameter related to at least one of: number of access probes, the frequency of the access probes, and the intensity of the access probes, so as to reduce the number and/or the frequency, and/or to vary the intensity of the probes transmitted by the mobile terminal from a default value of the same parameter used when an overload condition is not present in the system.

5. The method of claim 4 further comprising the step of:
    when an overload condition is determined to be easing, sending in a message information to change in a direction towards, its default values the value of at least one of the probe-related parameters that was changed in response to the overload condition.

6. The method of claim 1 wherein the information in the message is directed to a specific mobile terminal to inhibit that mobile terminal from attempting access for a period of time.

7. The method of claim 6 wherein the information in the message is directed to a specific mobile terminal to inhibit that mobile terminal from attempting access for a new connection for a period of time after that mobile terminal has completed a previous connection.

8. The method of claim 6 wherein the information in the message is directed to a specific mobile terminal to inhibit that mobile terminal from re-attempting access for a period of time after a previous unsuccessful access attempt.

9. The method of claim 1 wherein the information in the message redirects access requests made by a subset of the mobile terminals to a wireless system that is unavailable as a redirection target system.

10. The method of claim 9 wherein the message is a Global Service Redirection (GSR) message.

11. The method of claim 10 wherein the GSR message is repeatedly transmitted for a predetermined time period, after which a new GSR message is sent to redirect access requests made by a different subset of the mobile terminals to the unavailable redirection target system.

12. A method in a wireless communication system in which one or more mobile terminals attempt to establish communications with a base station through an access attempt, the method comprising the steps of:
    at a mobile terminal, making an access attempt in response to information in a message received from the base station that is transmitted to control the making of the access attempt when the base station determines that an overload condition is present, the base station determining that an overload condition is present when a number of seizures relative to a number of assignments recorded by the base station over a predefined period of time is greater than a predetermined threshold,
    wherein making an access attempt comprises transmitting one or more access probes and the information in the message controls the transmission of at least one of: the number of access probes, the frequency of the access probes, and the intensity of the access probes.

13. The method of claim 12 wherein the message is an overhead message that is continuously received over a paging channel.

14. The method of claim 12 wherein the information in the received message is used to change the value of at least one probe-related parameter related to at least one of: number of access probes, the frequency of the access probes, and the intensity of the access probes, so as to reduce the number and/or the frequency, and/or to vary the intensity of the transmitted probes from a default value of the same parameter used when an overload condition is not present.

15. The method of claim 14 further comprising the step of:
    in response to information in a message received when an overload condition is determined to be easing, changing in a direction towards its default value the value of at least one of the probe-related parameters that was changed in response to the overload condition.

16. The method of claim 12 wherein the information in the message inhibits making any access attempts for a specified period of time.

17. The method of claim 12 wherein the information in the message redirects a subsequent access request by the base station to an unavailable redirection target.

18. The method of claim 17 wherein the message is a Global Service Redirection message.

19. A method in a wireless communications system in which one or more mobile terminals attempt to establish communications with a base station through at least one access attempt, the method comprising the steps of:
when an overload condition is determined to be present, sending in a message information for controlling the access attempt,
wherein the access attempt comprises one or more access probes transmitted by the mobile terminal and the information in the message is for controlling the transmission of at least one of: the number of access probes, the frequency of the access probes, and the intensity of the access probes, and
wherein an overload condition is determined to be present based on the number of unsuccessful attempts by mobile terminals to access the system relative to the number of successful attempts to access the system over a predetermined period of time.

* * * * *